United States Patent [19]

Mitsuhashi et al.

[11] 4,021,651
[45] May 3, 1977

[54] PROGRAMMED MANIPULATOR

[75] Inventors: Kanzi Mitsuhashi; Kanji Matsushima; Osamu Miki, all of Akashi, Japan

[73] Assignee: Kawasaki Jukogyo Kabushiki Kaisha, Kobe, Japan

[22] Filed: Jan. 23, 1975

[21] Appl. No.: 543,597

Related U.S. Application Data

[63] Continuation-in-part of Ser. No. 371,632, June 20, 1973.

[30] Foreign Application Priority Data

June 20, 1972  Japan .......................... 47-61493

[52] U.S. Cl. ..................... 235/151.11; 340/172.5
[51] Int. Cl.² ..................... B25J 9/00; G06F 15/46
[58] Field of Search ............ 340/172.5; 235/151.11

[56] References Cited

UNITED STATES PATENTS

| 3,661,051 | 5/1972 | Dunner et al. ............... 91/35 |
| 3,668,653 | 6/1972 | Fair et al. ............... 340/172.5 |
| 3,686,639 | 8/1972 | Fletcher et al. ............... 340/172.5 |

*Primary Examiner*—Eugene G. Botz
*Attorney, Agent, or Firm*—Sughrue, Rothwell, Mion, Zinn & Macpeak

[57] ABSTRACT

In a computer controlled robot system which operates to perform a sequence of steps in accordance with a program stored in the computer, the program can be altered simply and conveniently by setting certain switch registers on an operation desk and indication box. The system can be operated to change the program by an operator having no knowledge of computer programming.

1 Claim, 15 Drawing Figures

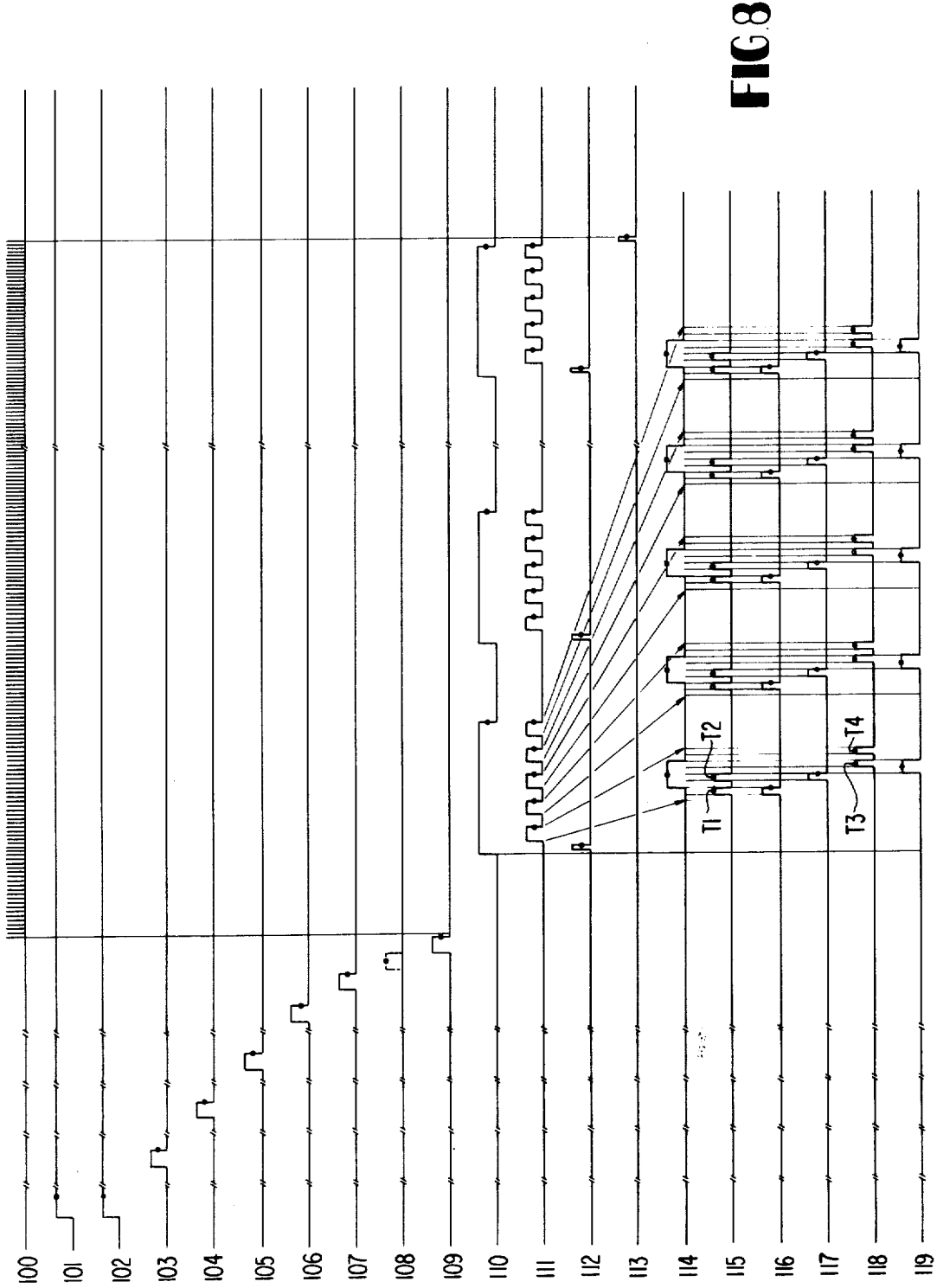

PROGRAMMED MANIPULATOR

This application is a continuation-in-part of application Ser. No. 371,632 filed June 20, 1973.

BACKGROUND OF THE INVENTION

1. Field of the Invention

The invention is in the field of automatic control systems in which a mechanical device executes a series of steps under control of a program stored in a computer 2. Prior Art The prior art relating to programmed manipulators is typified in U.S. Pat. No. 3,661,051, and more particularly to a type thereof wherein, in the teaching operation, digital positional signals indicative of an actual position of a manipulating portion brought into a desired position and digital operation signals indicative of an actual operational state are memorized in a memory as digital instruction signals indicative of an objective position of the manipulated portion and also indicative of an operational content of the memory at the time of the repetitive reproducing operation of the manipulator.

In a typical example of the programmed manipulators heretofore known, it is required to execute a teaching operation by manually driving the manipulating portion through desired positions in accordance with a predetermined sequence of operations, thereby to write into a memory a required number of digital position signals indicative of the actual positions taken by the manipulating portion together with other operational instruction signals such as instruction signals for the accessories to be co-operated with the manipulating portion and those for determining the driving speeds of the manipulating portion, and thereafter to execute repetitive reproducing operation by successively reading these operational instructions in the form of the digital instruction signals indicative of the objective positions of the manipulating portion, out of the memory, together with the above-mentioned other operational instruction signals.

SUMMARY OF THE INVENTION

It is therefore an object of the present invention to overcome the disadvantages of the prior art by providing a computer control system which is easily operable even by an ordinary operator of operative equipment and which requires only brief operation-stoppage time for changing the mode of operation.

Briefly, an operation desk is provided with setting registers and operation switches which can be simply operated by an operator to revise the program. To substitute a different step for an old step, the address of the old step and the operation of the new step are set in the setting switch register. The robot is moved by means other than the programmed computer to the position of said new step. Position information, operation information and auxiliary information (set in a setting switch register) are entered into the memory at the address of the old step and the computer is returned to the state where it controls the robot.

BRIEF DESCRIPTION OF THE DRAWINGS

FIG. 8 is a time chart showing the operation of the memory content revising device of FIG. 7.

DETAILED DESCRIPTION OF THE INVENTION

Figure 1:
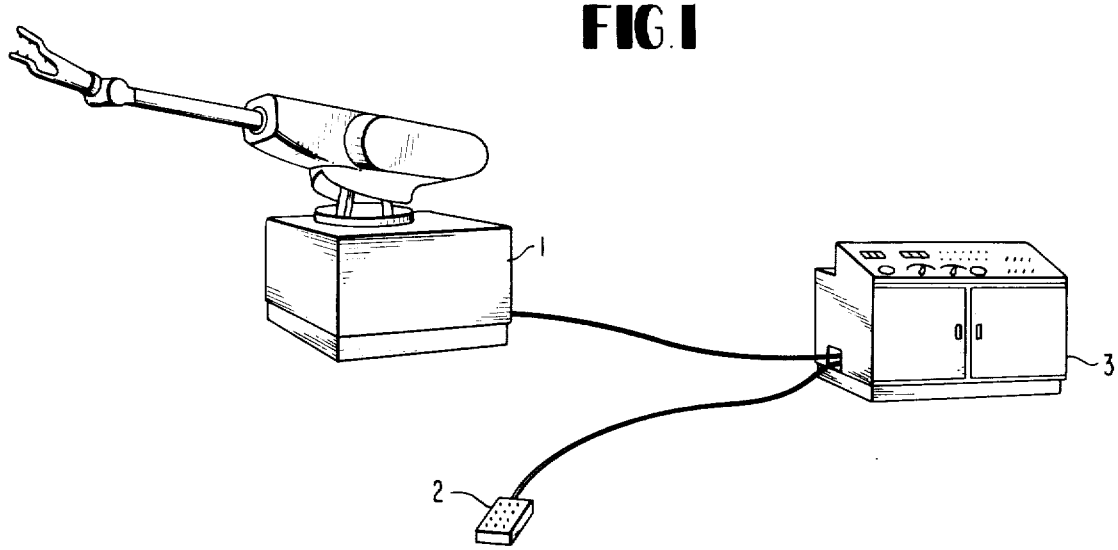
FIG. 1 is a schematic view of the general arrangement of a programmed manipulator according to the present invention.
Figure 2A:
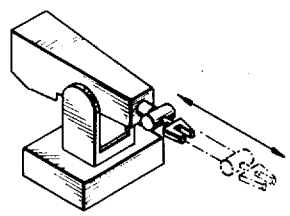
FIGS. 2a – 2f illustrates the various movements of a manipulating portion in the manipulator.
Figure 2B:
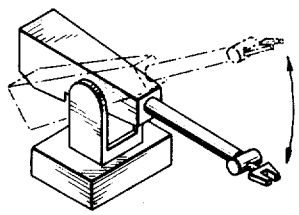
Figure 2C:
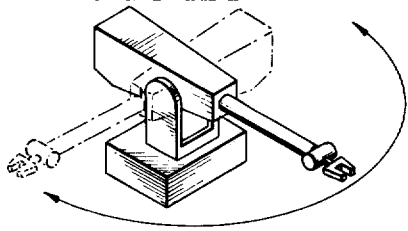
Figure 2D:
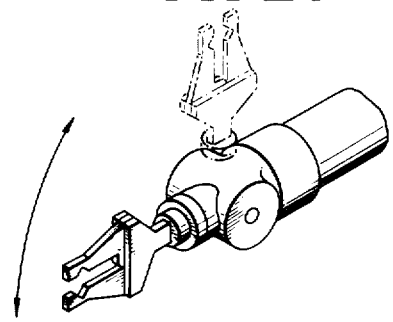
Figure 2E:
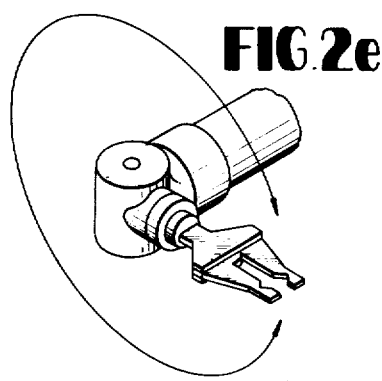
Figure 2F:
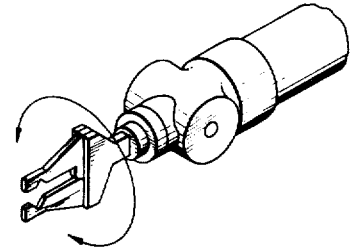

Referring now to FIG. 1 there is shown a general arrangement of the programmed manipulator according to the present invention in which 1 is primary component of the manipulator, 2 is the portable teach setter for manual operation of 1 and 3 designates a controller which controls the operation of the primary component. As shown in FIG. 2a–f the manipulator has 6° of freedom, three translatory along the X-Y-Z axes in FIG. 2a–c and three rotational, one about each principle axis.

Figure 3:
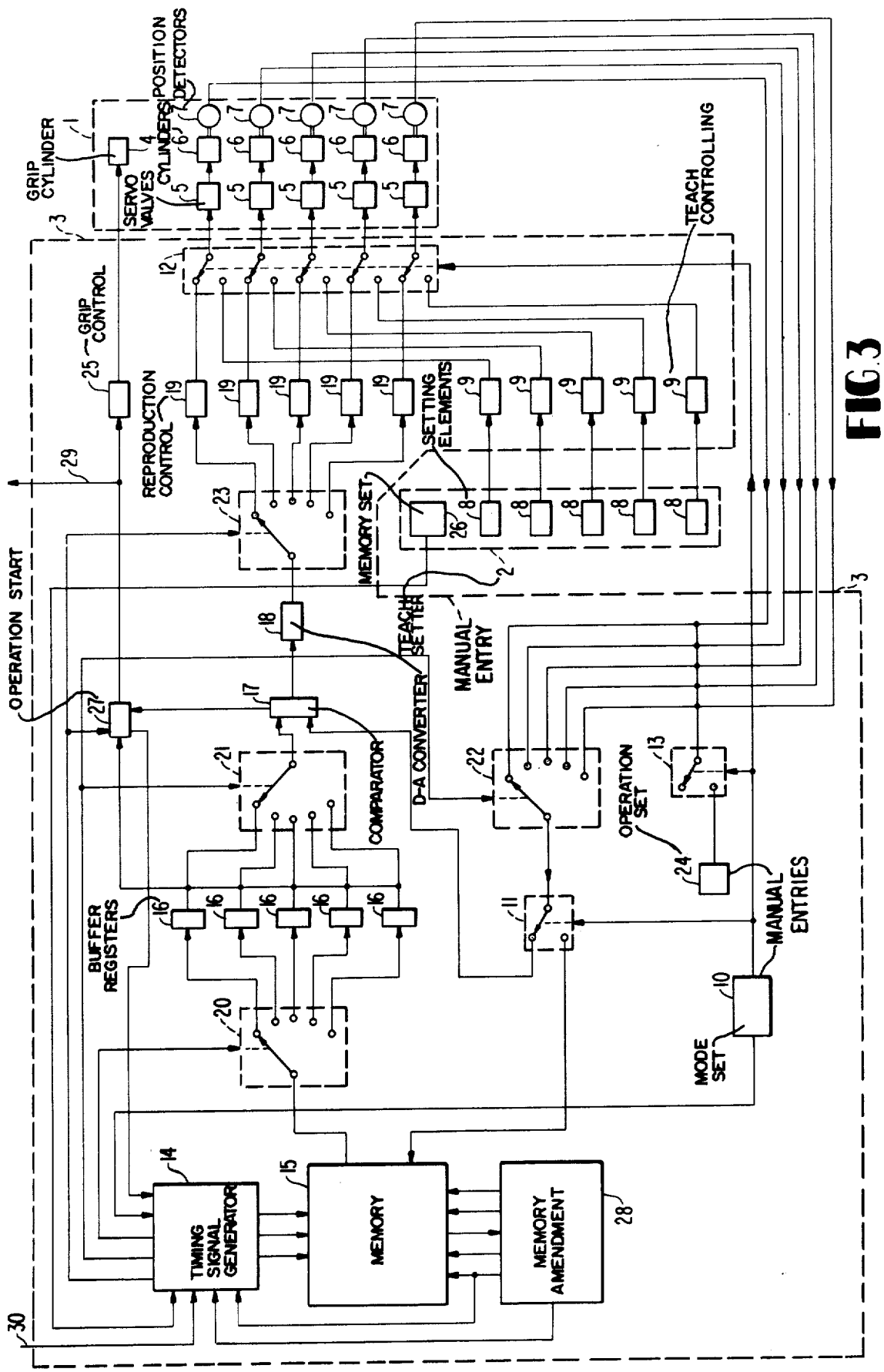
FIG. 3 is a block diagram of the operational elements of this invention.
Figure 9:
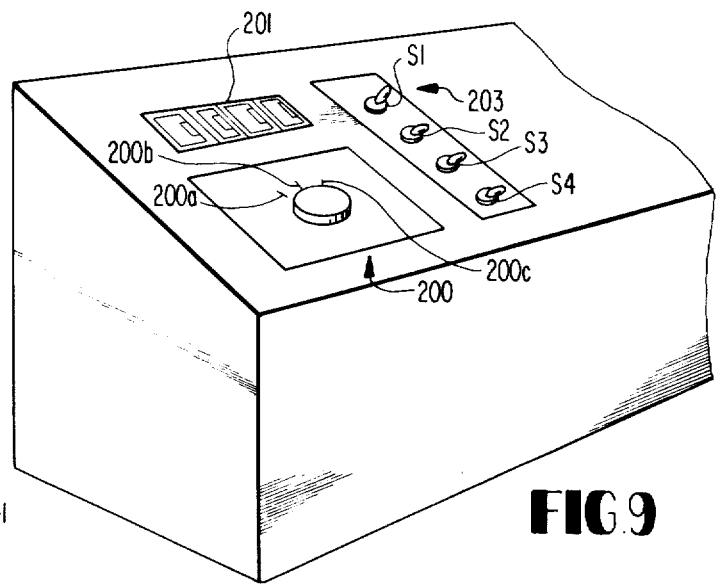
FIG. 9 is a view of controller which controls the operation of the manipulator.

Turning now to FIG. 3, numeral 4 designates a grip cylinder on the manipulator, 5 a group of servo valves, 6 cylinders and 7 real-time position detectors. In the example shown the number of servo valves, cylinders and detectors are equal to the number of degrees of freedom (6 minus 1 in this example) of the manipulator. Numeral 8 designates teach setting elements for the degrees of freedom which are operated manually for operating the manipulating portion in case of the teaching operation, numeral 9 designates teach controlling devices which transmit signals delivered from the teach setting elements 8 to the servo valves 5, numeral 10 is a mode setting device which is set in the teaching time or in the reproducing time, and numerals 11, 12, and 13 designate transfer switches controlled by the mode setting device 10. The transfer switches 11, 12, and 13 are operated in a ganged manner and are placed at the reproducing operation as shown in FIG. 3. Numeral 14 designates a timing signal generating device for supervising the entire system and also controlling transfer switches 20, 21, 22, and 23. Numeral 15 designates a memory device, 16 buffer registers, 17 a comparator which compares the position instruction signals with the present position signals in the degrees of freedom in a time-sharing manner, and delivers error signals in every degree of freedom, 18 a digital-analog converter, 19 reproduction control devices which distribute the output signal from the digital-analog converter 18 to the degrees of freedom of the manipulating portion and convey the output signal to the servo valves 5. 24 is an operation setting device which generates operation setting signals consisting of a setting signal for accessories co-operating with the manipulating portion, another setting signal for defining the driving speeds of the manipulating portion, and the like, 25 a grip controlling device for conveying the content in the buffer register 16 to the grip cylinder 4, and numeral 26 designates a memory setting device which, at the time of the teaching operation, causes the detected values obtained in the present position detector 7 for every degree of freedom of the manipulating portion and the output from the operation setting device 24 to be written in the memory 15. Numeral 27 designates an operation start instruction device which, in the reproduction operation, issues an operation start instruction at the time of the manipulating portion reaching at the desired operational position, numeral 28 a memory content revising device constituting a crucial part of the present invention, and output line 29 is the operational instruction signal and input line 30 is the operation completion signal for the accessories co-operated with the manipulating portion, respectively. The manipulating system shown in FIG. 3 operates as follows. The transfer switches 11 and 12 are thrown at teaching operation by the mode setting device 10, and the manipulating portion is introduced into a desired operational position by means of teach setting elements 8, and then the operating situation at the desired operating portion is instituted by means of the timing pulse generating device 14. The transfer scanners 21 and 22 are always transferred at a high speed in synchronism with each other by means of the timing pulse generating device. When the memory setting device 26 is operated in that state, the timing signal generating device 14 issues a writing instruction for designating addresses in the memory 15 and writing the contents of the present position detectors 7 and the operation setting device 24 through the transfer scanner 22 into these addresses in the memory 15 in a real-time-sharing manner. The above described manual operations are repeated for the entire sequence of the operations, and then the mode setting device 10 is operated to throw the transfer scanners 11, 12, and 13 to the reproduction operation. The timing signal generating device 14 then designates, in synchronism with the transfer of the transfer scanner 20, addresses in the memory 15 along with the operational sequence, and issues a read-out instruction. When the signals corresponding to the first operation unit are stored in the buffer register 16, the timing from the transfer scanner 20 is terminated. Thus, the output signals from the present position detectors 7 and the positional instruction signals stored in the buffer register 16 are compared in a time-sharing manner in the comparator 17 by the aid of the high-speed scanners 21 and 22 operating in synchronism with the transfer scanner 20. The compared result is decoded by the high-speed scanner 23 in synchronism with the scanners 21 and 22, and drives through the reproduction operation control device 19 the manipulating portion to the desired operational position. Such an operation is repeated until the output signals from the present position detectors 7 coincide with the positional instruction signals stored in the buffer register 16. The operation instruction signals and a grip instruction signal stored in a buffer register 16 are transmitted as operation instruction signals by the aid of the operation start instruction device 27.

After the above described operation, when an operation completion signal 30 is obtained, or when the operation instruction signal 29 is not present, the timing signal generating device 14 designates, upon coincidence between the instructed position and the present position, following addresses in the memory 15 along with the above described operational sequence, and issues a read-out instruction for the subsequent operation unit. Such an operation is repeated until the entire operational sequence is completed.

Herein, it should be noted that the operation of the unit is termed to be in a step mode. Thus, information is stored in the memory 15 according to the order of the step numbers in the operational sequence.

Figure 4:
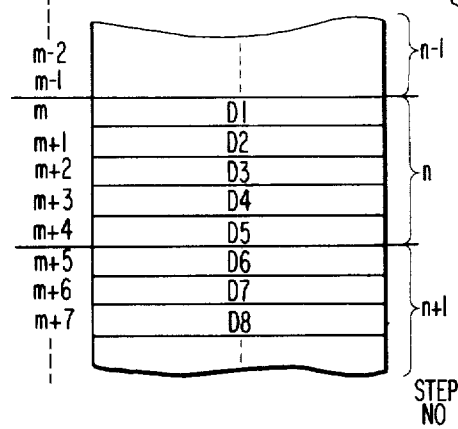
FIG. 4 is a schematic diagram showing the distribution of the digital position signals and the operation instructions signals stored in the memory.

FIG. 4 shows the distribution of the digital position signals and the operation instruction signals as stored in the memory 15. In the drawings $m$, $m+1$, $m+2$, $m+3$, $m+4$, . . . designate the memorizing addresses, D1, D2, D3, D4, D5, . . . designatethe digital position signals and operation instruction signals corresponding to the addresses, and $n$, $n+3$, $n+2$, $n+3$, . . . designate the step numbers. The term "step" as used herein means an operation unit included in the information to be read-in or read-out from the memory 15 at one time. In FIG. 4., digital position signals D1 through D5 constitute a unit step which is read out and stored in the buffer registers 16. For this reason, the arrangement of data within each step is fixed, and the relation between the addresses and the step number is also constant.

The operational principle of the manipulator with the exception of the memory content revising device 28 is disclosed generally in the U.S. Pat. No. 3,661,051. However, the programmed manipulator of the above described construction has drawbacks in that steps tend to be skipped at the time of the teaching operation, a certain step of information tends to be replaced by undesired information, or an excess step is added in the addresses, and when such a fault is discovered, in the reproduction mode, the operation must be transferred again to the teaching mode. Furthermore, even if the teaching has been carried out correctly, there is generally a necessity that some part of the sequential operation will require revision at a later point in time. In this case, the steps corresponding to this part of the sequential operation must be taught again. The conventional manipulator, typified by the prior art, has serious difficulties in handling such problems of revision.

Figure 5:
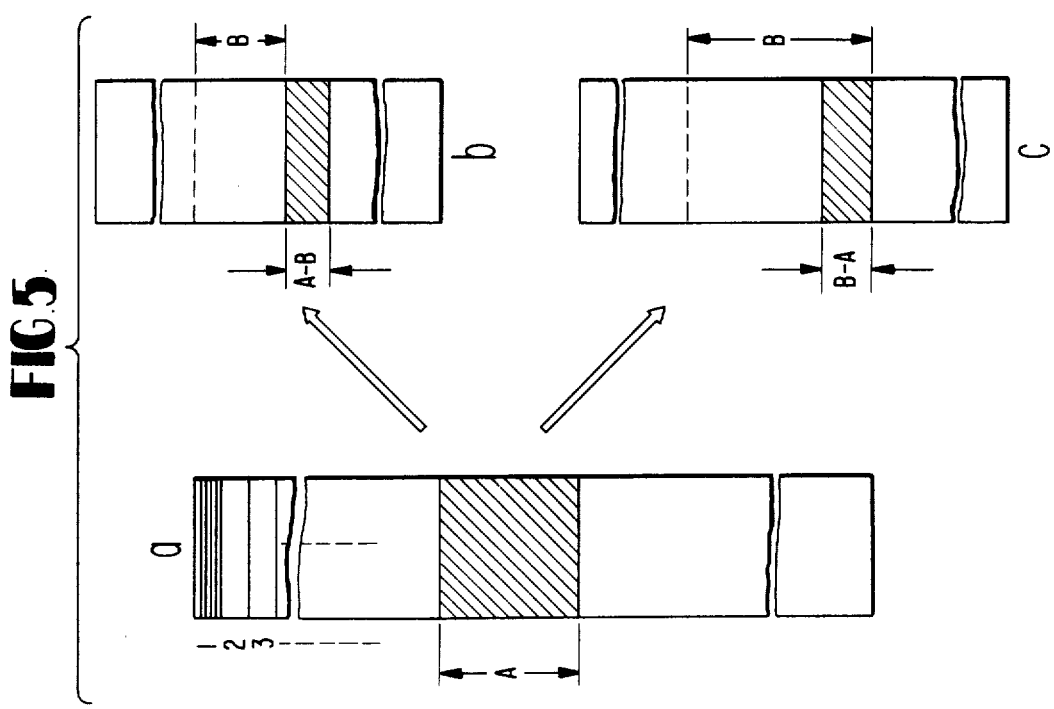
FIG. 5 is a schematic view of stepped information stored in the memory.

FIG. 5 indicates how stepped information is stored in the memory of prior art devices in schematic manner. As is apparent in the drawing, the stored information steps are arranged in the order determined by the initial teaching operation. The arrangement before revision of the information steps is indicated in FIG. 5a, and the arrangements after revision of the same steps are indicated in FIGS. 5b and 5c. In the drawing, assuming that the portion A represents information which is not required after revision, and the portion B represents information which is obtained by the revision, if the two regions are of the same size, only the region A is revised by the region B. However, if the region A is greater than the region B, unnecessary information remains in the portion "A − B" as shown in FIG. 5b, and if the region A is smaller than the region B, the information included in the portion "B − A" is removed by rewriting as shown in FIG. 5c although the information in that portion is necessary. In either of the cases, desired operations can not be obtained at the time of the reproduction. For this reason, the entire information after the revised information must be rewritten by resuming the teaching mode of operation for this part, such a procedure requiring a considerable time and labor.

The present invention overcomes the above described drawbacks of the conventional programmed manipulator by the use of the memory content revising device 28, such that the revising operation of the memory can be far simplified, and furthermore, the initial teaching operation is facilitated. In the latter case, the teaching operation is not required to follow the entire sequence of the reproduction operation, but it can be initiated from any arbitrary step of operation. The device 28 will now be described with reference to FIGS. 6-10.

Figure 6:
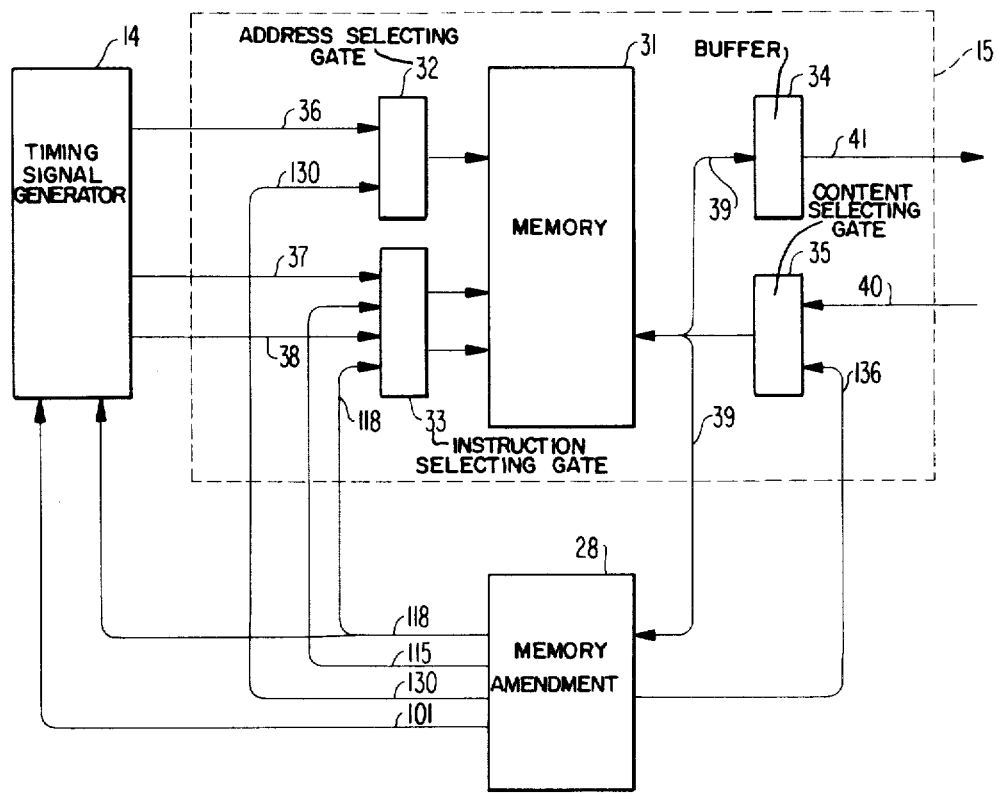
FIG. 6 is a logic diagram showing the relationship between the memory, timing signal generator and memory content revision device according to the invention.

Referring first to FIG. 6, the relation between the memory 15, the timing signal generating device 14, and the memory content revising device 28 is apparent. In FIG. 6, a memory portion 31, a memory address selecting gate 32 are shown. Gate 32 selects either one of a memory address signal 36 delivered from the timing signal generating device 14 and another memory address signal 130 delivered from the memory content revising device 28, thereby to designate a memory address in the memory portion 31. A memory content instruction selecting gate 33 selects either one of a memory content readout instruction signal 37, a memory content writing instruction signal 38, both delivered from the timing signal generating device 14, a memory content readout instruction signal 115, and a memory content writing instruction signal 118, both delivered from the memory content revising device 28, and designates the reading or writing operation of the thus selected result to or from the memory portion 31.

A buffer register 34 temporarily stores an information signal 39 delivered from the memory portion 31 at a timing in synchronization with transfer switch 20 activation by an output of the timing signal generating device 14, and delivers the thus stored information through the transfer switch 20 to the buffer register 16. A memory content selecting gate 35 which selects either one of a time-sharing information 40 to be memorized at the instruction operation through the transfer switch 11 and in information signal 136 to be memorized delivered from the memory content revising device 28, and stores the thus selected information in the memory portion 31.

Where no revision is required, the memory content revising device 28 is not operated, and the gates 32, 33, and 35 receive a selection signal from the timing signal generating device 14 thereby to select input signals 36 and 37 or 38 and 40, and the memory content readout buffer register 34 also receives when required a memory content readout timing signal from the timing signal generating device 14.

Where some revision is required for the memory, the memory content revising device 28 according to this invention is operated, the operation of the device 28 initiated by setting the manipulating system in the teaching mode and also manually setting the device 28 to issue a memory content revising signal 101 and if required a memory content writing signal 118 as shown in FIG. 6. The gates 32, 33, 35 then receive a selecting signal from the timing signal generating device 14 so that input signals 130, 115, or 118, 136 are selected by these gates. Furthermore, the memory content readout buffer register 34 stops to receive the memory content readout timing signal from the timing signal generating device 14 because the manipulating system is now operated in the teaching mode.

Figure 7:
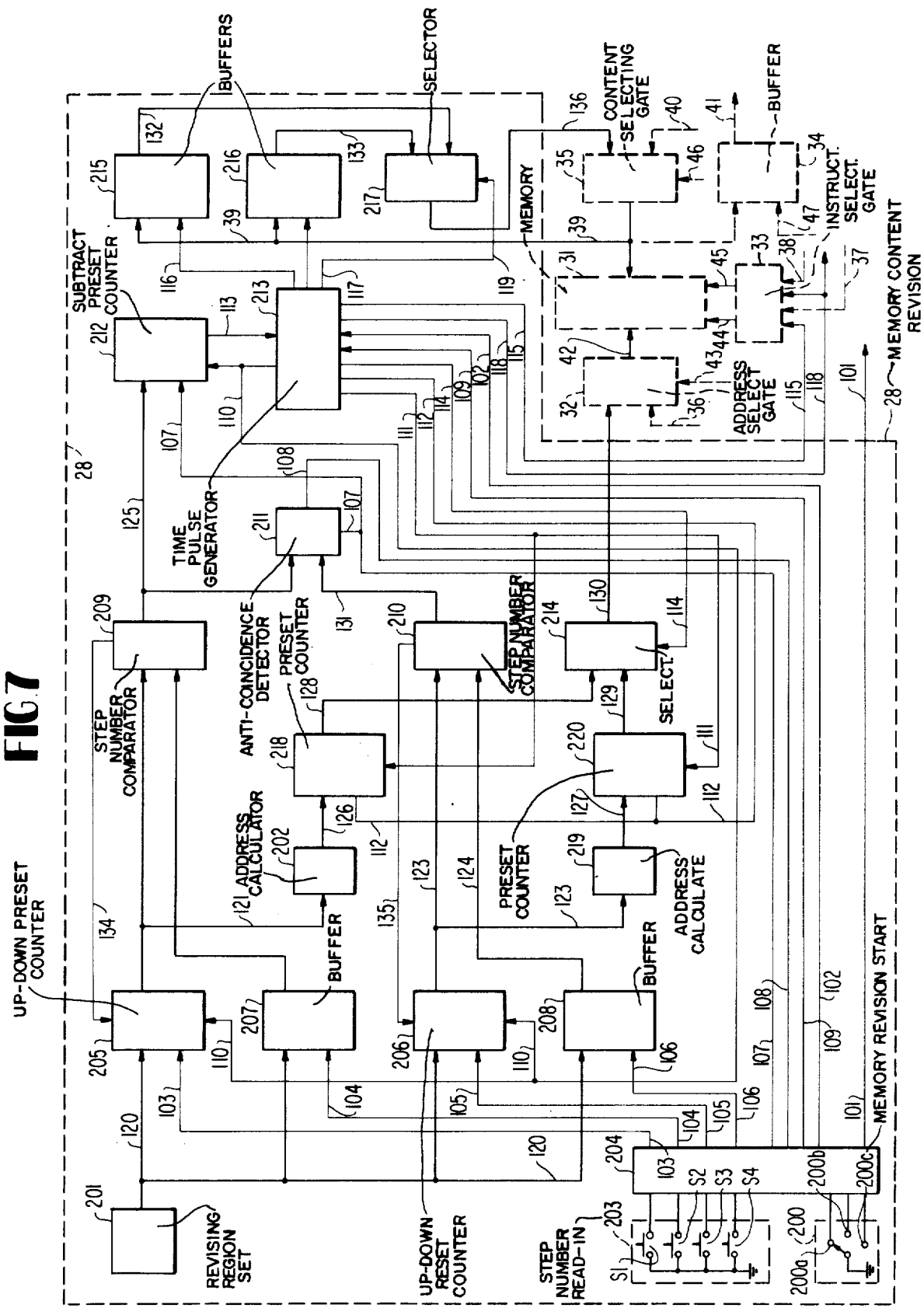
FIG. 7 is a block diagram showing one preferred embodiment of a memory content revising device.

FIG. 7 is a block diagram showing the memory content revising device 28 according to the present invention, and FIG. 8 is a time-chart for explaining the operation of the example shown in FIG. 7. Referring first to FIG. 7, numeral 200 designates a revising method setting device, numeral 200a designates a state of the device 200 wherein the contents in two regions are exchanged between each other, 200b designates another state wherein the content of one region is shifted to another region, 200c designates still another state wherein the memory content revising device 28 is not operated. A revising region setting device 201 sets sequentially the leading step number and the ending step number of a first region and the leading step number and the ending step number of a second region. A step number read-in device 203 including switches S1, S2, S3, and S4 operates to read-in the step numbers set in the revising region setting device 201 in a sequential manner, and 204 designates a memory revision starting device.

Up-down pre-set counters 205 and 206 store a step number signal 120 delivered from the revising region setting device 201 with the aid of the signals 103 and 105 delivered from the memory revision starting device 204 in response to the operations of the switches S1 and S3 in the step number read-in device 203, and simultaneously receive addition and subtraction instruction signals 134 and 135 delivered from step number comparators 209 and 210 thereby to add one or subtract one each time receiving a pulse signal 110 from a timing pulse generating device 213. Buffer registers 207 and 208 store the step number signal 120 delivered from the revising region setting device 201 under the aid of signals 104 and 106 delivered from the revision starting device 204 in response to the operations of the switches S2 and S4 in the step number read-in device 203. Address calculating devices 202 and 219 convert step number signals 121 and 123 delivered from the up-down preset counters 205 and 206 into addresses in the memory portion 31. In this example, one step corresponds to five addresses.

Additional preset counters 218 and 220 store address signals 126 and 127 delivered from the address calculating devices 202 and 219 by the aid of a pulse signal 112 delivered from the timing pulse generating device 213, and add 1 to the content of each counter in response to each pulse of a pulse signal 111. A number comparator 209 compares the output signal 121 from the up-down preset counter 205 with the output signal 122 from the buffer register 207 thereby to obtain a difference signal 125, and in this case, if the information of the signal 122 is greater than the information of the signal 121, an addition instruction is given to the up-down preset counter 205, and if the former is smaller than the latter, a subtraction signal is given to the up-down counter 205. A number comparator 210 compares the output signal 123 from the up-down counter 206 with the output signal 124 from the buffer register 208, thereby to obtain a difference signal, and if the information of the signal 124 is greater than the information of the signal 123, an addition instruction is given to the up-down preset counter 206 through a signal 135, and if the former is small than the latter, a subtraction instruction is given to the same through the signal 135. An anti-coincidence detecting device 211 upon reception of a pulse signal 107 delivered from the revision starting device 204, compares the output signal 125 from the number comparator 209 with the output signal 131 from the other number comparator 210 thereby to confirm that the error signal is zero, and when the error signal is not zero, delivers difference signal 108 for stopping the sequence thereafter. A subtraction preset counter 212 stores the output signal 125 from the number comparator 209 by the aid of a pulse signal 107 delivered from the revision starting device 204, and subtracts "1" from the thus stored content upon reception of a pulse signal 110 delivered from the timing pulse generating device 213, thereby to deliver an output pulse signal 113 when the content is brought to a specific state ( - 1 in this example). Selecting device 214 selects either of the memory address signal 128 or 129 delivered from the addition preset counter 218 or 220 upon reception of the pulse signal 114 delivered from the timing pulse generating device 213.

Additionally, buffer registers 215 and 216 store a memorizing information signal 39 delivered from the memory portion 31 by the aid of pulse signals 116 and 117 delivered from the timing pulse generating device 213. Selector 217 selects either one of the memorizing information signals 132 or 133 delivered from the buffer registers 215 or 216 by the aid of a pulse signal 119 delivered from the timing pulse generating device 213. The timing pulse generating device 213 is started by the signals 102 and 109 delivered from the revision starting device 204 thereby to deliver a pulse signal 110 to the subtraction preset counter 212, the up-down preset counters 205 and 206, and then stop delivering the signal 110 upon reception of the out-put signal 113 from the subtraction preset counter 212. The timing pulse generating device 213 delivers a pulse signal 111 including pulses of a number equal to the number of addresses (five in this example) constituting one step for each pulse of the signal 110 while the signal 110 is delivered from the timing pulse generating device 213, said pulse signal 111 is applied to the addition preset counters 218 and 220. Device 213 also delivers other pulses which are required for exchanging the contents of the addresses in the two regions of the memory portion 31, at a rate of one address for one pulse of the signal 111, and for enabling read-out from or writing into the memory portion 31 of a content for the purpose of shifting the content in one address to the other address.

The operation of the memory content revising device 28 shown in FIG. 7 will now be described with reference to a time-chart shown in FIG. 8.

Signal 100 is a reference pulse generated in the timing pulse generating device 213, and signal 101 is a signal which comes "present" when the position 200a and 200b are selected in the revising method setting device 200, and becomes "none" when the position 200c is selected. It should be known that when the memory content revising device 28 is not used, the device 200 is placed to the 200c position. Signal 102 is an inhibition signal which becomes "present" only when the device 200 is placed to the 200a position thereby to cause a normal signal relationship, but when the position 200b is selected, the signal 102 inhibits the creation of the sixth split signal T3 in the hereinafter described signal 118. Signals 103, 104, 105, and 106 are generated in response to the operations of the switches S1, S2, S3, and S4 in the step number read-in device 203, and are setting pulses for allowing the output signal 120 delivered from the revising region setting device 201 to be received in the up-down preset counter 205, buffer register 207, up-down preset counter 206, and the buffer register 208. Signal 107 is a setting pulse which is used for allowing the output signal 125 from the number comparator 209 and the output signal 131 from the number comparator 210 to be received in the anti-coincidence detecting device 211, and also for allowing the output signal 125 from the number comparator 209 to be received in the subtraction present counter 212. Signal 108 is an inhibition pulse signal which is not delivered in the normal state, but is delivered when the anti-coincidence detecting device 211 is operated by the signal 107 thereby to inhibit the sequence after the signal 109, signal 109 is a starting pulse which causes to start the internal reference pulse signal 100 and a pulse signal 110 in the timing pulse generating device 213 when the signal 108 is not created. Signal 110 is a pulse signal which is started by the signal 109 and continuously oscillates at a frequency dividing the frequency of the signal 100, and the signal 110 also acts as a counting pulse signal to be applied to the subtraction preset counter 212 and the up-down preset counters 205, 206, thereby to cause the content of the subtraction preset counter 212 to be varied in a reducing direction, to cause the content of the up-down preset counter 205 to coincide with the content of the buffer register 207, and also to cause the content of the up-down preset counter 206 to coincide with the content of the buffer register 208, all at the time of the pulse 110 steps down.

Signal 111 is generated in the timing pulse generating device 213 and is applied to the addition preset counters 218 and 220 as a counting pulse signal. The signal 111 includes pulses whose number equal to the number of memory addresses (five in this example) constituting one step are generated for each pulse of the signal 110. Signal 112 is a setting pulse signal which sets input signals 126 and 127 to be applied to the addition preset counters 218 and 220 each time a pulse of the signal 110 is generated and before the signal 111 is applied thereto. Signal 113 is a completion pulse signal which is generated when the subtraction preset counter 212 becomes a specific state (− 1 in this example) thereby to terminate the signal 100. Signal 114 is a selection pulse signal which is formed in such a manner that each pulse of the signal 111 is divided into four parts, the first one part and the last one part are removed, and in the remaining parts, the signal 114 is made to be "present". At the time of the signal 114 is in the "present" state, the selecting device 214 selected the output signal 129 of the addition preset counter 220, and in the rest of time, the selecting device 214 selects the output signal 128 of the addition preset counter 218. Signal 115 is a memory content readout instruction signal which acts through the memory content instruction selecting gate 33 to the memory portion 31 with respect to the memory address selected by the selection device 214. The signal 115 is formed in such a manner that, as in the case of the signal 114, each pulse of the signal 111 is divided into 8 parts, and the signal 115 is made to be "present" in the second part, $T_1$, and the fourth part, $T_2$.

Also, signal 116 is a setting pulse signal which is established in the second part $T_1$ of the signal 111 and effectively acts at the step-down time of the second part $T_1$. The signal 116 causes the information 39 read out of the memory portion 31 to be applied to the buffer register 215. Signal 117 is a setting pulse signal which is established in the four part $T_2$ of the signal 111 and effectively actable at the step-down time of the fourth part $T_2$. The signal 117 causes the information 39 read out of the memory portion 31 to be applied to the buffer register 216.

Signal 118 is a memory content writing instruction signal which acts on the memory portion 31 through the memory content instruction selecting gate 33 with respect to the information 136 to be memorized selected by the selecting device 217 and also a memory address selected by the selecting device 214. The signal 118 is formed as in the case of the signal 115 in such a manner that each pulse of the signal 111 is divided into eight parts, and the signal 118 is made to be "present" in the sixth part $T_3$ and in the eighth part $T_4$. Signal 119 a selecting pulse signal which selects either one of the output signals 132 and 133 delivered from the buffer registers 215 and 216 and to be applied to the selecting device 217. The signal 119 is formed as in the case of the signal 114 in such a manner that each of the pulses in the signal 111 is divided into four parts, and the signal 119 is made to be "present" in the third part. When the signal 119 is in the "present" state, it acts on the selecting device 217 to select the output 132 of the buffer register 215, and when the signal 110 is in the rest of state, it acts on the device 217 to select the output 133 of the buffer register 216. It is so arranged that when the output 132 of the buffer register 215 is selected, the sixth part $T_3$ of the signal 111 is brought to the "present" state. Signal 130 is a memory address signal which is selected in the selecting device 214 and applied to the memory address selecting gate 32 in the memory device 15 as shown in FIGS. 6 and 7. Likewise, the signal 136 is a memory information signal which is selected in the selecting device 217 and applied to the memory content selecting gate 35 in the memory device 15 as shown in FIGS. 6 and 7. In FIG. 8, those lines marked with 0 are the parts of the signals effectively actable to the objective devices.

The memory content revising device 28 according to the present invention can be operated in a simple manner. An outline of the operation will now be described with reference to FIG. 9. The operator of the device selects revising method by means of the revising method setting device 200. Next, the operator sets the forward step number in a revising region by the revising region setting device 201, and operates the switch S1 in the step number read-in device 203. The content thus set in the revising region setting device 201 is then read into the up-down preset counter 205 in the memory content revising device 28. The operator then sets the end step number of the revising region in the revising region setting device 201, and depresses the switch S2 in the step number read-in device 203. The forward step number and the end step number of the other revising region are also set to be read into the memory content revising device 28 in the similar manner by means of the step number read-in device 203 by depressing the switches S3 and S4 therein. After these setting operations, the memory content revising device 28 automatically revises the content of memory according to the time sequence as shown in FIG. 8.

Thus the unnecessary information in the part A–B in FIG 5b can be eliminated by designating the step numbers and by condensing the required information in the following addresses. Likewise, the part B–A indicated in FIG. 5c can be avoided by designating the step numbers and the required information subsequent to the region A in FIG. 5a is shifted downward by a length corresponding to B–A. Thus, the labor consuming operations in the conventional memory content revising device wherein not only the region of the memory to be revised but also all of the subsequent steps of information must be revised by resuming the teaching operation, can be substantially eliminated by the provision of the revising device according to this invention. Furthermore, in the ordinary sequence of operation, the same routine frequently appears several times. In this invention, such a routine can be read in by executing one teaching operation, and the content thus read-in can be transcribed in any of the desired parts in the entire memory. When an operational sequence includes a portion wherein the same routine is reciprocated, only one pass of the routine should be memorized by the teaching operation, and the return pass thereof may be omitted by the operation of the present device. Thus, considering the matter in more generalized manner, the teaching operation need not follow the actual sequence of operation, but it may be carried out section by section, each section for one time, of the memory, and these sections of memory may be rearranged in the order of the step numbers.

Figure 10:
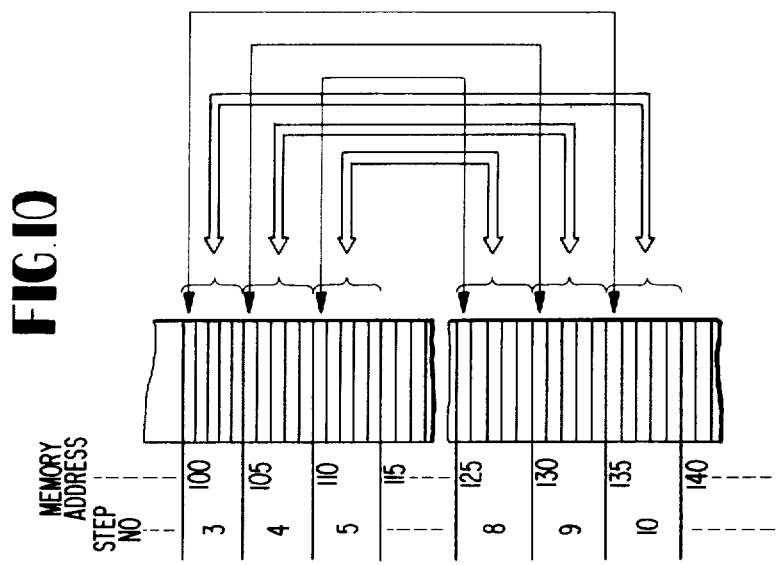
FIG. 10 is a schematic of the sequence of stored instructions in the memory.

For the simplication of the description, a case is considered, as shown in FIG. 10, wherein the contents of step numbers 3 through 5 are exchanged by the contents of the step numbers 10 through 8. In this case, the forward address signal for the step number 3 is first selected by the selecting device 214, and the content of this address is stored in the buffer register 215 by the aid of $T_1$ in the signal 115 and the signal 116. Then the forward address signal corresponding to the step number 10 is selected by the selecting device 214, and the content of this address is stored in the buffer register 216 by the signal 117 and $T_2$ in the signal 115. Next, in the state where the selecting device 214 is selecting the forward address signal corresponding to the step number 10, the content of the buffer register 215 is written in the addresses corresponding to the step number 10 by the aid of the signal 119 and $T_3$ in the signal 118. And then, the content of the buffer register 216 is written in the addresses corresponding to the step number 3 by the aid of the signal 119 and $T_4$ in the signal 118. By the above-mentioned operations, the contents of the forward addresses corresponding to the step numbers 3 and 10 are exchanged between each other. The contents of the step numbers 4 and 9 and so forth can be exchanged by repeating the above described procedure which will be made apparent in FIG. 10.

Since the memory content, revising device 28 inclusive of the memory device 15 and the timing signal generating device 17, are operating as if an electronic computer, these may be replaced by a suitable type of electronic computer.

What is claimed is:

1. In a programmed manipulator having a manipulating portion, a device for driving the manipulating portion in a plurality of different axes, a device for generating digital signals representing an actual position of the manipulating portion, a device for memorizing said digital signals thereby to produce digital instruction signals representing an objective position of the manipulating portion, a comparator comparing said instruction signals with said actual positional signals thereby to produce error signals, a device for controlling said driving device based on said error signals, said error signals are thereby reduced, and a device for controlling manually said driving device without depending on said error signals; the improvement comprising:

a memory revising region setting means for shifting the content of one region to another region in said memory device, when a step is defined to be an information group corresponding to a unit of operation, or for exchanging the contents of two regions between each other, sets the numbers A and B for leading step and the last step within a first region and also the numbers C and D for the leading step and the last step within a second region of memory in said memorizing device;

a plurality of up-down preset counters for storing signals indicative of said step numbers A and C delivered from said revising region setting means, and adding or subtracting 1 from the thus stored contents of the counters each time a pulse is received;

a plurality of buffer registers for holding the signals indicative of said step numbers B and D also delivered from said revising region setting means;

a first step number comparator which compares the output from one of said up-down preset counters with the output from one of said buffer register thereby to produce a difference signal and sends to the up-down preset counter an instruction for addition of subtraction depending on the sign of said difference signal;

a second step number comparator which compares the output of the other said up-down present counters with the output of the other of said buffer registers to produce a difference signal, and sends to the other of said up-down present counters an instruction for addition or subtraction depending on the sign of said difference signal;

a subtraction preset counter which stores the output of said first step number comparator, subtracts 1 from the thus stored content each time when a pulse is received, and when the content is found to be a predetermined state, produces an output indicative of said state;

a plurality of address calculating means for calculating actual addresses in the memory based on the outputs of both of said up-down preset counters;

a plurality of addition preset counters to store the address outputs from both of said address calculating means, respectively, and add "1" to the contents each time when a pulse is received therein until the additions are carried out in a number of times equal to the number of addresses included in said unit of operation constituting a step;

first means for selecting either one of the outputs from said addition preset counters twice for each pulse received and sending the selected output to said memory;

a plurality of buffer registers for holding respectively the contents of memorized addresses selected by said selecting means and sequentially delivered from said memory, and delivering the thus held contents into the memorizing addresses selected by said selecting means;

second means for selecting either one of the outputs from said buffer registers once for each pulse added to said addition preset counters and sends the thus selected output to said memory; and timing pulse generating means for delivering a first train of pulses to said subtraction preset counter and said up-down preset counters until the same pulse train is stopped by the output signal from the subtraction preset counter, said timing pulse generating means delivering a number of second train of pulses equal to the number of addresses for the memory unit constituting said step each time when one of said first train of pulses is received to said addition preset counters, said timing pulse generating means further delivering for each of said second train of pulses a number of pulses required for making it possible to read out of said memory the contents in the addresses in said two regions in said memory, for the purpose of exchanging the contents between each other or of shifting one content to the address corresponding to the other content, and for making it possible to write the same into said memory.

* * * * *